United States Patent [19]
Yasutomi et al.

[11] Patent Number: 5,271,871
[45] Date of Patent: Dec. 21, 1993

[54] CONDUCTIVE MATERIAL AND PROCESS FOR PREPARING THE SAME

[75] Inventors: Yoshiyuki Yasutomi, Katsuta; Tadahiko Miyoshi, Hitachi; Masahisa Sobue, Mito; Nobuyuki Yamashita; Hiroshi Nagase, both of Hitachi; Kiyohiko Tanno, Katsuta; Shoji Arimoto, Kamakura; Fumio Jooraku, Hitachi, all of Japan

[73] Assignee: Hitachi, Ltd., Tokyo, Japan

[21] Appl. No.: 754,501

[22] Filed: Sep. 3, 1991

Related U.S. Application Data

[62] Division of Ser. No. 319,307, Mar. 6, 1989, Pat. No. 5,085,806.

[30] Foreign Application Priority Data

Mar. 7, 1988 [JP] Japan .................. 63-51487

[51] Int. Cl.$^5$ .................................................. H01B 1/06
[52] U.S. Cl. ............................. 252/518; 428/699; 501/87; 501/95; 501/97
[58] Field of Search .................. 430/60, 66; 428/698, 428/699; 501/96, 97, 98, 87, 95; 252/512, 513, 515, 516, 518

[56] References Cited

U.S. PATENT DOCUMENTS

| | | | |
|---|---|---|---|
| 4,647,546 | 3/1987 | Hall, Jr. et al. | 501/96 |
| 4,742,209 | 5/1988 | Minegishi et al. | 219/270 |
| 4,877,760 | 10/1989 | Okuno et al. | 501/98 |
| 4,902,653 | 2/1990 | Komatsu et al. | 501/97 |
| 4,923,829 | 5/1990 | Yasutomi et al. | 501/95 |
| 4,975,395 | 12/1990 | Lumby et al. | 501/98 |
| 5,023,214 | 6/1991 | Matsumoto et al. | 501/97 |
| 5,041,350 | 8/1991 | Yagi | 430/58 |

*Primary Examiner*—Mark L. Bell
*Assistant Examiner*—A. Wright
*Attorney, Agent, or Firm*—Antonelli, Terry, Stout & Kraus

[57] ABSTRACT

The invention provides a conductor comprising a reaction-sintered body of a conductive nitride produced from a powder of at least one metal selected from Ti, Zr, V, Nb, Ta, Cr, Ce, Co, Mn, Hf, W, Mo, Fe, Pr, Nd, Sm, Eu, Gd, Tb, Dy, Ho, Yb, Lu, Th and Ni, and a process for producing such conductor by heating a molding containing a metal powder in a nitriding gaseous atmosphere containing no CO gas.

10 Claims, 11 Drawing Sheets

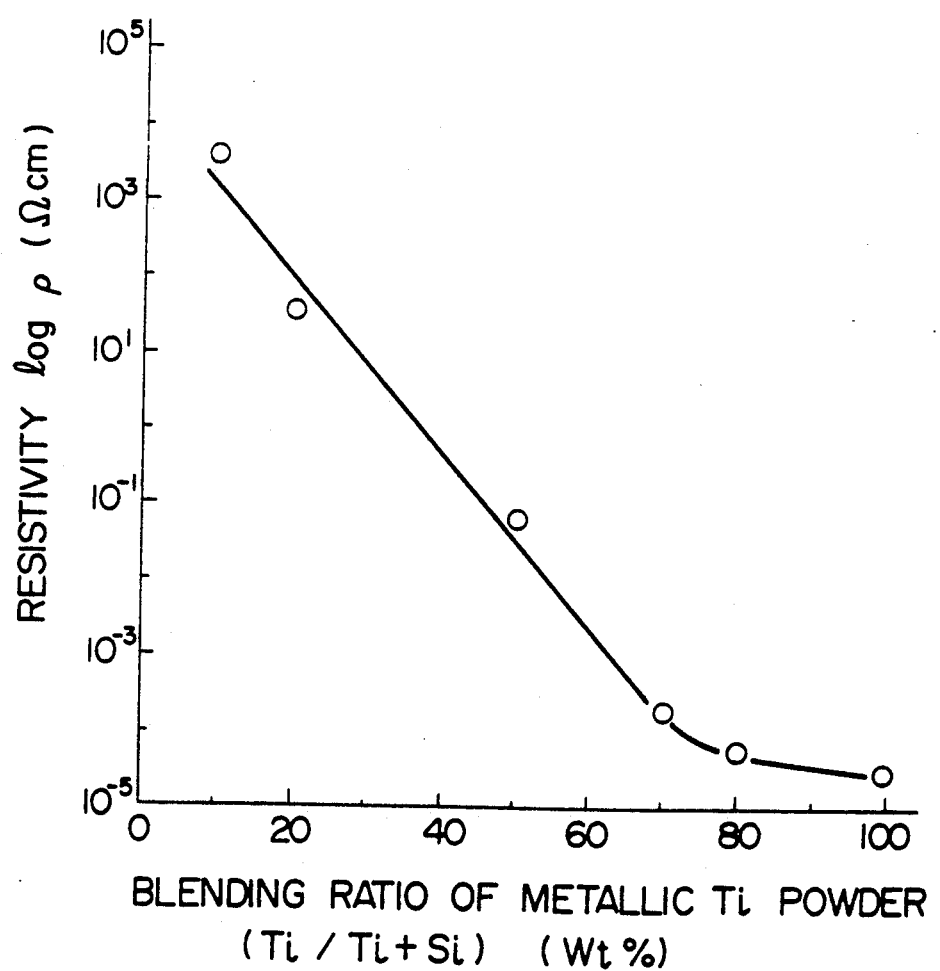
F I G. 1

FIG. 11(a)  FIG. 11(b)
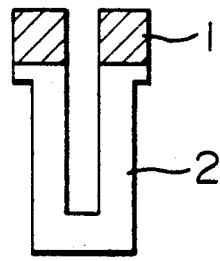
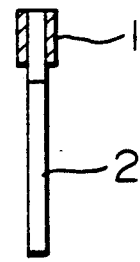
FIG. 12
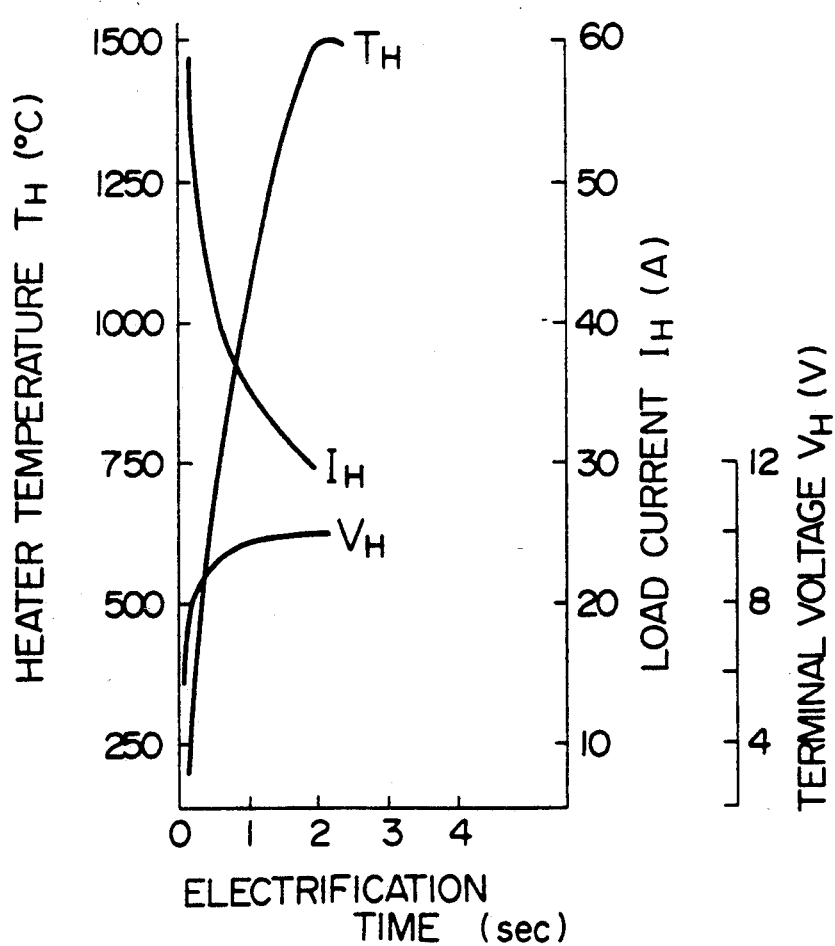

CONDUCTIVE MATERIAL AND PROCESS FOR PREPARING THE SAME

This is a division of application Ser. No. 07/319,307, filed Mar. 6, 1989 now U.S. Pat. No. 5,085,806.

BACKGROUND OF THE INVENTION

1. Field of the Invention

This invention relates to a conductive material comprising a reaction-sintered body which incurs only a slight dimensional change in the sintering operation, and a process for producing such conductive material

2. Description of Related Art

Highly heat resistant SiC, $Si_3N_4$ and the like are generally known as engineering ceramics suited for use as structural material for engines, turbines and the like. Among the known techniques for sintering such materials are the so-called pressureless sintering method, pressure sintering method and reaction-sintering method. Among them, a pressureless sintering method and pressure sintering method carry a high risk of deformation and are poor in dimensional precision, with the possible rate of dimensional change at the time of sintering running as high as 15 to 20%, and highgrade techniques are required for these methods on the part of the workers. The high rate of dimensional change during sintering requires much time and cost for post-sintering work, and this has been one of the greatest obstructions to the popular use of engineering ceramics. As for the reaction-sintering method, on the other hand, it is known that the rate of dimensional change suffered at the time of sintering is small in comparison with the materials sintered by other methods, and it is only disclosed in Japanese Patent Kokai (Laid-Open) No. 58-140375 that the material is composed of a nitride of metallic Si powder and little is known about the conductivity of such material.

$Si_3N_4$ binding material, which has been generally used as a refractory, is also a material which is expected to suffer little dimensional change in sintering. Such material is disclosed in Japanese Patent Kokai (Laid-Open) No. 58-88169, but nothing is told about conductivity. Further, the mechanical strength of this material is as low as about 50 MPa, which frustrates any expectation of its use as a structural material.

Lately, request is strong for the development of conductive ceramics useful as heat-resistant heater materials or conductors. Invention of ceramics with small electrical resistivity would contribute greatly to the improvement of performance of currently used products and would also pave the way for new and wider use of ceramics. In the conventional conductive ceramics, as for instance disclosed in Japanese Patent Kokai (Laid-Open) Nos. 50-84936, and 60-44990, a conductive compound is mixed with SiC or $Si_3N_4$ and the mixture is hot-press sintered to solve the problem of electroconductivity. The hot press method, however, involves the problem of high production costs as it requires a vast amount of energy for sintering.

Further, Japanese Patent Kokai (Laid-Open) No. 60-60983 discloses a method for obtaining a conductive ceramic material by mixing a conductive compound with $Si_3N_4$ and subjecting the mixture to pressureless sintering which is more advantageous in terms of energy than the hot press method. However, since this method utilizes a sintering aid, the rate of dimensional change at the time of sintering may rise up to 15–18%, posing the problem of intolerable deformation.

Japanese Patent Kokai (Laid-Open) No. 61-247662 discloses a sintered body comprising a Cr carbonitride obtained by reacting and sintering a Cr powder molding with CO in $N_2$ gas at 1,500° C., such sintered body being described as having a specific resistance at room temperature of more than $10^{-4}$ Ωcm. In this case, since a Cr powder molding is reacted and sintered in a CO-containing $N_2$ gas, the produced sintered body differs in composition between the surface portion and the inside portion, that is, the obtained sintered body has different properties at its surface and in the inside, and thus there can not be obtained a sintered body with uniform quality.

As described above, there have been available no practical techniques for producing ceramics having excellent dimensional precision and capable of controlling electrical resistivity to a low level.

The aforementioned conventional techniques have been deficient in the rate of dimensional change at the time of sintering, electrical resistivity, mechanical strength, etc., and the use of the products as mechanical structural material or functional material has been limited.

SUMMARY OF THE INVENTION

The object of the present invention is to provide conductor made of a reaction-sintered body which suffers little dimensional change in the sintering operation and has a uniform composition, a process for producing such conductor and uses thereof.

The conductor according to the present invention is composed of a reaction-sintered body of a nitride produced from a metallic powder, the sintered body being minimized in dimensional change in the sintering operation by effecting interparticle bonding while reducing the voids between particles by a conductive nitride produced from a metallic powder in the molding during sintering. The present invention is intended to enable optional control of electrical resistivity according to the type of reaction-sintered body.

BRIEF DESCRIPTION OF DRAWINGS

FIG. 1, FIG. 3 and FIG. 6 are the graphs showing the relation between electrical resistivity and material blending ratio.

FIG. 11(a) and FIG. 11(b) are a plan view and a side view, respectively, of a heater.

FIG. 12 is a graph showing the relation among heater electrification time, heater temperature, terminal voltage and load current.

DETAILED DESCRIPTION OF THE INVENTION

Figure 2:
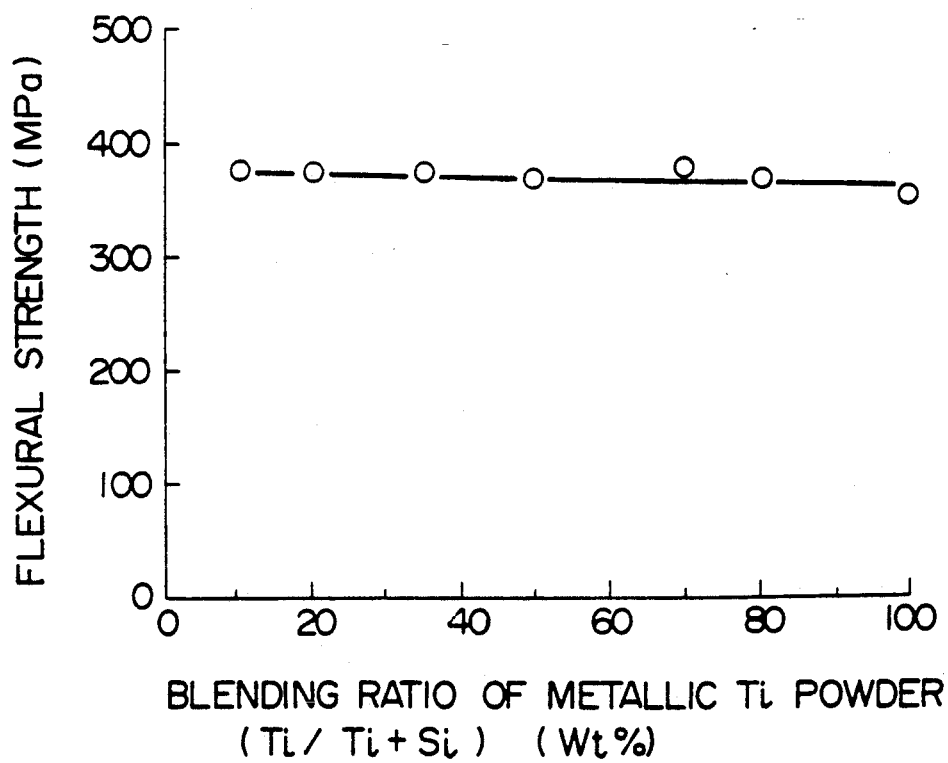
FIG. 2 and FIG. 4 are the graphs showing the relation between bending strength and material blending ratio.

The metallic powder used in the present invention is a powder of a metal or metals belonging to Group III to Group VIII of the Periodic Table, and it comprises at least one metal selected from Ti, Zr, V, Nb, Ta, Cr, Ce, Co, Mn, Hf, W, Mo, Fe, Pr, Nd, Sm, Eu, Gd, Tb, Dy, Ho, Yb, Lu, Th and Ni. For instance, a nitride of Ti can provide a sintered body of low resistivity since the electrical resistivity of such nitride is as low as about $5 \times 10^{-5}$ $\Omega$cm or less. Also, mixing of at least one of powdered Si and Al with said metallic powder can greatly change resistivity since the nitride of Si or Al has as high an electrical resistivity as the order of $10^{15}$ $\Omega$cm. Thus, the resistivity of the nitride varies depending on the type of metallic powder used, and by properly combining such metallic nitrides of different resistivities, it becomes possible to control resistivity over a wide range from conductor to insulator. Control of resistivity is also made possible by mixing a metallic powder and an inorganic compound.

The metal nitride obtained has reaction product particles or whiskers of 30 $\mu$m or less. This product is formed in a net shape relative to the other unreacted product and combines with it.

In the present invention, a recommended means for controlling resistivity is to reduce the content of at least one of silicon nitride and aluminum nitride formed from Si and Al powder to 90% by volume or less.

In the present invention, it is desirable to keep the content of inorganic compound at or below 7% by volume for preventing a drop of strength.

The inorganic compound used in the present invention should preferably have an average particle size of 100 $\mu$m or less for maintaining film strength. Whiskers or long fibers may be used as the inorganic compound. The whiskers used in the present invention are preferably ones having an average aspect ratio of 200 or less and an average length of 200 $\mu$m or less. Use of long fibers has the advantage of making it possible to give an orientation to the electrical properties by properly orienting such fibers.

In the present invention, it is preferred to adjust the porosity to 30% or less for preventing a reduction of strength. In reaction-sintering under atmospheric pressure, the porosity becomes 5% or more in the practical production processes, but when sintering is conducted under a pressured atmosphere, the porosity becomes 1% or less. The pores comprise open pores. This is for the following reason: for obtaining a sintered body by sintering a molding made of metallic powder under a nitriding gas atmosphere and changing such metallic powder into a nitride through reaction with said nitriding gas, presence of vent holes is necessary for allowing the nitriding gas to pass through the molding In this sintering operation, there may occur a reaction between the powder metals in case the powder metals used are of specific types, but such reaction presents no problem relating to the properties of the sintered body. As a result of such reaction, there may be partly produced TiAl, TiAl$_3$, TiSi, ZrAl or the like.

In the present invention, further reduction of porosity is possible by subjecting the obtained sintered body to such treatment as hot pressing, hot isostatic pressing or post-sintering. Such treatments, however, are undesirable where a high dimensional precision is required.

The molding is heated for a long time under a nitriding gas atmosphere consisting of nitrogen and/or ammonia, and if necessary with hydrogen, argon, helium or the like added thereto, at a temperature below the melting point of metallic powder in the initial stage of sintering, and then further heated preferably at a high temperature, such as 600° to 1,350° C., especially 1,100° to 1,350° C. No CO gas is substantially contained.

In the present invention, the molding binder is prepared by adding an organic high molecular compound such as butyral or polyethylene and an organic Si high molecular compound such as siliconimide compound or polysilane compound, each in a suitable amount, preferably 8 to 15 parts by weight, and the particle packing density in the molding is adjusted preferably to 65% or more. The reason for this is described below.

The starting powder itself is composed of brittle solid particles, so that when the powder is simply pressed, it is difficult to effect desired packing and the molding may develop strain or even cracks as the pressure is increased. It is therefore necessary to add a certain organic binder to assist fluidity of the powder and to increase the strength of the molding. The strength of the sintered body is affected by the amount of the organic binder added. Such change of strength of the sintered body according to the amount of the organic binder added is apparent, for example, from the relation between the amount of organic binder added and the strength of TiN sintered body obtained according to the sintering method of the present invention by using metallic Ti powder. This phenomenon has a relation to the particle volume packing density in the molding. The particle volume packing density in the molding will not increase when the amount of the organic binder is too large or too small, but when the optimal amount to be added is increased, the fluidity of the mixture under heating is improved to facilitate pressure molding, resulting in an improved particle volume packing density in the molding. However, if the organic binder is mixed more than void rate when the starting powder is in an ideal closely packed state, the starting powder is rendered into an isolated state in the binder. Good fluidity of the mixture is maintained, but the solid content in the molding decreases as the binder increases, resulting in a reduction of particle volume packing density in the molding.

In the present invention, the cells in the composite ceramic sintered body may be impregnated with particles of a resin, oil or the like. Applications of the present invention to sliding members are also possible.

The electrically conductive ceramics according to the present invention can be subjected to discharging works by reducing electrical resistivity.

In the present invention, it is preferred that the compound produced from the metallic powder would form the center of the nitride phase, because when sintering is carried out in an oxidizing gas, an oxide phase is formed, making it difficult to control electrical resistivity.

According to the present invention, by carrying out the reaction-sintering operations with nitrides produced from various metal powders, there can be obtained uniform ceramics minimized in dimensional change in the sintering operation and controllable in electrical resistivity optionally from conduction to insulation.

A prominent feature of the present invention resides in interparticle linkage of inorganic compounds by the particles and whiskers of conductive nitrides produced from said metal powders. This can be attained by adding a binder made of a thermoplastic resin in said metal powders, kneading the mixture under heating, subjecting the mixture to hot pressure molding to form a molding with a particle volume packing density of 60 vol % or more, removing the binder in said molding by a heat treatment, and then sintering the molding by heating in a nitriding gas atmosphere free of CO gas.

In the above process, a binder is added in an amount defined as follows:

$$B = [(7S/20,000) + 3] \pm 2.5$$

wherein B is the amount of binder added, expressed by parts by weight to 100 parts by weight of the starting powder composition, and S is specific surface area (cm$^2$/g) of starting powder. After kneading under heating, the mixture is subjected to hot press molding to form a molding with particle volume packing density of preferably 70 vol % or more.

Thus, preferably the composition contains a binder composed of said mixed powder and thermoplastic resin and has an apparent viscosity at 150° C. of 3 to 9×10$^4$ N·s/m$^2$, the amount of binder being determined as described above.

The particle diameter of said mixed metal powder should be not more than 10 μm, preferably not more than 1 μm, and the particle diameter of the powder of inorganic compound should be not more than 100 μm, preferably not more than 20 μm. As for these powders, the commercially available products can be used in the form as they are, but it is recommended to grind them by a mill or other means to form spherical particles for use in this invention.

Said inorganic compound powder may be partly replaced with whiskers. The amount of whiskers used is preferably not more than 55 vol % in the sintered body composition. Use of a greater amount of whiskers may make uniform blending of the starting materials hard. The whiskers used in this invention are preferably those having an average aspect ratio of 200 or less and an average length of 200 μm or less.

As binder, it is possible to use a thermoplastic resin employed for the preparation of preforms for ceramic sintering. For example, polyvinylbutyral, polyethylene, polysilicone, synthetic waxes and the like are usable.

Such binder plays an important role in this invention. That is, the amount of binder added proves to be a decisive factor for adjusting the particle volume packing density in the molding to less than 60 vol %.

The present inventors have studied further on this finding and disclosed that there existed a very profound interrelation between the specific surface area of starting powder and the amount of binder added as calculated per 100 parts by weight of the starting powder, and the present invention has been reached from these findings.

First, the specific surface area S (cm$^2$/g) of starting powder can be determined as follows:

$$S = \frac{6}{\rho \cdot d}$$

wherein $\sigma$ is a density and d is an average particle size (μm). The relation between said specific surface area S and binder amount B making the particle packing density in the molding greater than 60 vol % (the amount being parts by weight to 100 parts by weight of starting powder composition) is given by the formula already shown before (B=[(7S/20,000)+3]±2.5).

By adding binder in an amount within the range defined by the formula above, it is possible to make the particle packing density in the molding higher than 70 vol % and to provide a sintered body having a flexural strength of about 300 MN/m$^2$ or higher The starting composition blended with said specified amount of binder has its apparent viscosity defined in the range of 3 to 90×10$^4$ N·s/m$^2$, and by selecting this range of viscosity, it is possible to predict fluidity at the time of molding and to obtain a molding with a packing density higher than 60 vol %, so that a composition suited for near-net shaping can be provided. Especially by making a packing density higher than 70 vol %, there can be obtained a composition with even higher strength. In practical use, a packing density not higher than 85 vol % is preferred, and near-net shape moldings are obtainable.

From the viewpoint of fluidity of the starting composition, use of a metal powder with a particle size not greater than 1 μm is preferred. As binder, it is advised to add a blend comprising 15 to 60% by weight of polyethylene, 30 to 70% by weight of wax and 5 to 25% by weight of stearic acid.

The starting composition with the binder resin added thereto is sufficiently kneaded and then molded. Molding can be accomplished by using various molding methods such as injection molding, press molding, rubber press molding, extrusion molding, doctor blade method, metallic powder molding, etc., from which a proper method is selected according to the shape of the molded product, required properties and other factors. Usually, hot molding is carried out at a temperature above the softening point of the binder resin. When molding is conducted by using a mechanical press, a molding pressure of about 1,000 kgf/cm$^2$ is applied. A doctor blade method is recommended for manufacturing thin substrates.

The molding is degreased (cleared of binder) before sintered. Degreasing can be accomplished by heating the molding slowly from room temperature at a rate of about 2° C./hr until reaching about 500° C.

A heating rate of 4° C./hr till reaching the sintering temperature is suited for effecting desired sintering with ease. If necessary, hot press may be applied.

The sintered body obtained according to this invention preferably has a porosity below 30%. When the porosity exceeds 30%, the sintered body is reduced in strength. A porosity below 30% can be accomplished by adjusting the particle volume packing density in said molding to greater than 60 vol %.

In the sintered body are present whiskers of nitrides produced in the sintering process. It is desirable that such whiskers be contained in an amount of 1 to 70 vol %, especially 10 to 30 vol %, based on the reaction product phase.

The notably small dimensional change (about 0.15% or less) in the sintering operation in the production of ceramics according to the present invention may be accounted for as follows.

First, the dimensional change in the sintering operation is highly associated with the nitride whiskers produced by sintering in a nitriding atmosphere. It is desirable that such whiskers be adjusted to be present in an amount of 1 to 30 vol % in the nitride produced.

Regarding the relation between blending ratio of starting materials (metal/(metal+inorganic compound)) and dimensional change at the time of sintering and flexural strength in a sintering operation carried out by adding 9 parts by weight of a thermoplastic resin to a mixture of metal powder and inorganic compound, mixing them under heating, subjecting the mixture to hot press molding and, after removing the binder, sintering the molding in a nitrogen gas, the fact is noted that whiskers of the produced nitride increase and the strength rises as the amount of metal used increases. Dimensional change also increases during sintering, but it is practically insignificant.

This is considered attributable to close interparticle linkage of the sintered body by the whiskers produced in the sintering operation. Especially, obtainment of a sintered body with as high a flexural strength as 300 MN/m$^2$ or more by the presence of 45 vol % or more of whiskers is considered ascribed to such an increase of linkage chains.

Flexural strength is greatly influenced by the amount of binder resin used. This is associated with the volume packing density of particles in the molding.

Starting powder itself comprises brittle solid fine particles, and packing thereof is difficult by simple pressing Therefore, it is necessary to add a binder to enhance fluidity of the powder and to also elevate strength of the molding. The strength of sintered body is changed according to the amount of binder added. As already mentioned, this is associated with the volume packing density of particles in the molding. Increase of binder improves fluidity of the heated mixture to facilitate pressure molding. As a result, volume packing density of particles in the molding increases. However, when the binder is added in a larger amount than the void volume in a case such that the starting powder is in a state of ideal closed packing, the starting powder is rendered into an isolated state in the binder, and although fluidity is improved, the solid content in the molding decreases to cause a corresponding reduction of volume packing density of particles in the molding, resulting in an increased porosity and reduced strength of the sintered body.

As described above, the whiskers produced from metal powder sintered by heating in a nitriding atmosphere function for effecting interparticle linkage while also serving for filling the voids between the particles to make a three-dimensional growth in the sintered body, making it possible to obtain ceramics with high toughness.

In accordance with the present invention, it is possible to easily obtain a ceramic material which suffers not more than 2% of dimensional change when sintered and whose electrical resistivity can be controlled optionally from a conductive state to an insulative state. The present invention also makes it possible to easily obtain a ceramic complex which is small in dimensional change by sintering and can have a desired resistivity within the range from $10^{14}$ to $10^5$ Ωcm by adjusting the blended amounts of an electrically conductive compound and insulating compound. Since the present invention cannot substantially require any working costs after sintering, the present invention can expand the scope of use of ceramics to a variety of fields including not only structural parts such as engine and turbines but also to various types of heaters, electrode materials, motor brush, commutator, substrates, current collector, aircraft and space technology, iron and steel, oceanographic development, etc.

EXAMPLE 1

To a metallic Ti powder having an average particle size of 1 μm was added 4 parts by weight of an organic binder comprising polyethylene wax, synthetic wax and stearic acid as molding binder, and the mixture was kneaded by a press kneader under heating at 160° C., at which the resin is softened, for a period of 5 hours. After cooling, the kneaded mixture was crushed to prepare a sample starting material. This material was mechanical press molded under a molding pressure of 1,000 kgf/cm$^2$ at a temperature of 160° C. to form a molding of 50 mm in diameter and 20 mm in thickness. The volume packing density of particles in the obtained molding was greater than 60 vol %. This molding was heated in an argon gas atmosphere at a heating rate of 3° C./hr to 500° C., and then after removing the molding binder, the molding was further heated in a nitrogen gas atmosphere at temperatures of about 10 stages from 600° C. to 1,300° C., heating at each stage being conducted for an almost equal time, thus heating the molding for a total period of about 80 hours at respective temperatures to obtain a sintered body. The properties of the thus obtained sintered body are shown in Table 1.

By way of comparison, a sintered body was obtained by using a starting material consisting of 40 vol % of Si$_3$N$_4$ powder having an average particle size of 0.8 μm, 55 vol % of TiN powder and 5 vol % of Y$_2$O$_3$ as a sintering aid, molding the mixture in the same way as described above, and sintering the molding at 1,700° C. for 5 hours. The properties of this sintered body are also shown in Table 1.

It will be seen that in the product of the present invention the particles are bound with TiN alone without intermediation of other substances at grain boundaries, and as compared with the comparative sintered body in which a sintering aid Y$_2$O$_3$ was added to Si$_3$N$_4$ powder and TiN powder for binding the particles with additional Y$_2$O$_3$ at grain boundaries, the product of the present invention is very small (0.8%) in dimensional change during sintering. It is thus possible according to the present invention to obtain ceramics having good near-net shaping characteristics and low electrical resistivity. Dimensional change indicates the change of length. It was also confirmed that a slight amount of metal remained in the sintered body of the present invention. Electrical resistivity shown here is measured along a section of the cut sintered body. Resistivity from the surface was also measured by changing the cut section, but resistivity was substantially the same for both the inside and outside.

The sintered body of the present invention formed therein approximately 2 vol % of whiskers. A three-point bending test according to the JIS was used for the flexural test in the present invention.

TABLE 1

| | Dimensional change during sintering (%) | Electrical resistivity (Ω cm) | Flexural strength (MPa) |
|---|---|---|---|
| Example 1 | 0.8 | $3 \times 10^{-5}$ | 360 |
| Comp. Example 1 | 13.4 | $1 \times 10^{-4}$ | 340 |

EXAMPLE 2-23

Molding and sintering were carried out by following the same procedure as Example 1, except that the metals (powder) shown in Table 2 were used in place of Ti. The properties of the obtained sintered bodies are shown in Table 2. It is noted that the products of the present invention are all 1% or less in dimensional change in the sintering operation and have a high flexural strength (300 MPa or above). Also, their electrical resistivity can be optionally controlled in the range from $10^4$ to $10^{-5}$ Ωcm according to the type and amount of metal powder used. In the products of these Examples, too, about 2 vol % of whiskers were formed and a slight amount of metal(s) remained.

TABLE 2

| EXAMPLE | Ratio of material(s) (powder) blended (wt %) | Dimensional change in sintering (%) | Electrical resistivity (Ω cm) | Flexural strength (MPa) |
|---|---|---|---|---|
| 2 | Zr:100 | 0.8 | $2 \times 10^{-5}$ | 345 |
| 3 | V:100 | 1.0 | $8 \times 10^{-5}$ | 320 |
| 4 | Nb:100 | 0.9 | $1 \times 10^{-4}$ | 300 |
| 5 | Ta:100 | 0.7 | $2 \times 10^{-4}$ | 312 |
| 6 | Cr:100 | 0.8 | $9 \times 10^{-5}$ | 305 |
| 7 | Ce:100 | 1.0 | $2 \times 10^{-5}$ | 345 |
| 8 | Ti:80, Si:20 | 0.5 | $6 \times 10^{-5}$ | 365 |
| 9 | Ti:70, Al:30 | 0.7 | $2 \times 10^{-4}$ | 348 |
| 10 | Ti:20, Si:80 | 0.6 | $5 \times 10^{-1}$ | 370 |
| 11 | Ti:10, Si:90 | 0.6 | $4 \times 10^{-3}$ | 372 |
| 12 | Ti:90, Co:10 | 0.8 | $5 \times 10^{-5}$ | 338 |
| 13 | Ti:90, W:10 | 0.7 | $6 \times 10^{-5}$ | 340 |
| 14 | Zr:85, Fe:15 | 0.7 | $4 \times 10^{-4}$ | 324 |
| 15 | Zr:85, Pr:15 | 0.9 | $7 \times 10^{-4}$ | 305 |
| 16 | Zr:85, Yb:15 | 0.9 | $6 \times 10^{-4}$ | 302 |
| 17 | Cr:95, Gd:5 | 0.8 | $9 \times 10^{-4}$ | 325 |
| 18 | Zr:85, Ho:15 | 0.8 | $4 \times 10^{-4}$ | 335 |
| 19 | Ta:85, Sm:15 | 0.8 | $8 \times 10^{-4}$ | 298 |
| 20 | Zr:85, Nd:15 | 0.8 | $4 \times 10^{-4}$ | 312 |
| 21 | Zr:85, Dy:15 | 0.8 | $9 \times 10^{-4}$ | 305 |
| 22 | Ti:83, Eu:9, Lu:8 | 0.8 | $9 \times 10^{-5}$ | 352 |
| 23 | Zr:80, Ni:15, Th:5 | 0.8 | $8 \times 10^{-5}$ | 345 |

EXAMPLE 24

A sintered body was obtained by carrying out molding and reaction sintering in the same manner as Example 1, except for changing the blending ratio of metallic Ti powder having an average particle size of 1 μm and metallic Si powder having an average particle size of 1 μm. The composition of the obtained sintered body was a 2-phase mixture of TiN and $Si_3N_4$, and in this sintered body, about 2 vol % of whiskers were formed and a slight amount of metals remained.

In FIG. 1 is shown the relation between electrical resistivity and ratio of material blended, and FIG. 2 shows the result of a test conducted on the relation between flexural strength and material ratio. It is seen from these graphs that electrical resistivity is variable within the range of $10^4$ to $10^{-5}$ Ωcm by changing the ratio of material blended It is also learned that flexural strength is 300 MPa or above irrespective of the ratio of material blended.

EXAMPLE 25

A sintered body was obtained by repeating the same molding and reaction-sintering operations as in Example 1, except for changing the blending ratio of metallic Ti powder having an average particle size of 1 μm and that of metallic Al powder having an average particle size of 1 μm. The composition of the obtained sintered body was a 2-phase mixture of TiN and AlN, in which whiskers were formed and a small quantity of metal remained.

Figure 3:
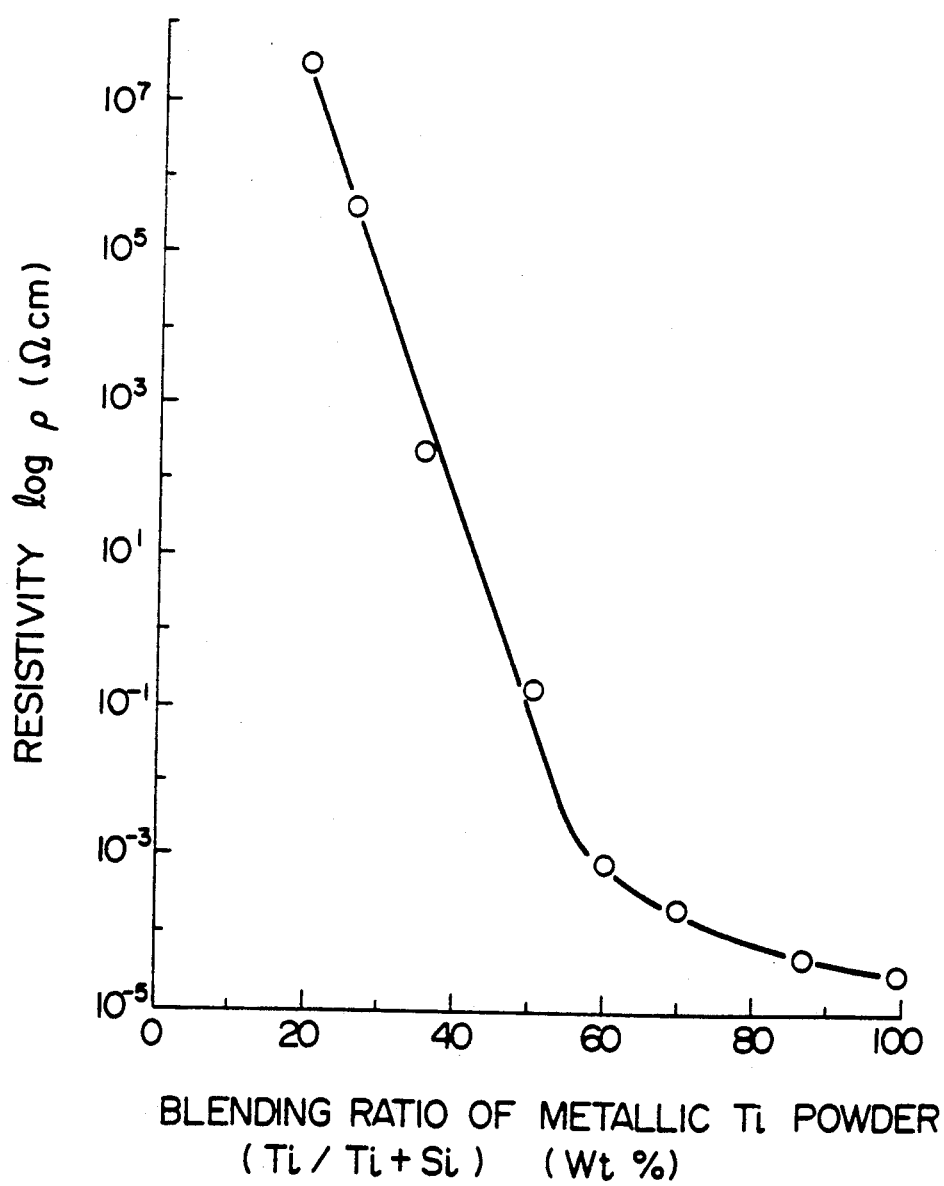
Figure 4:
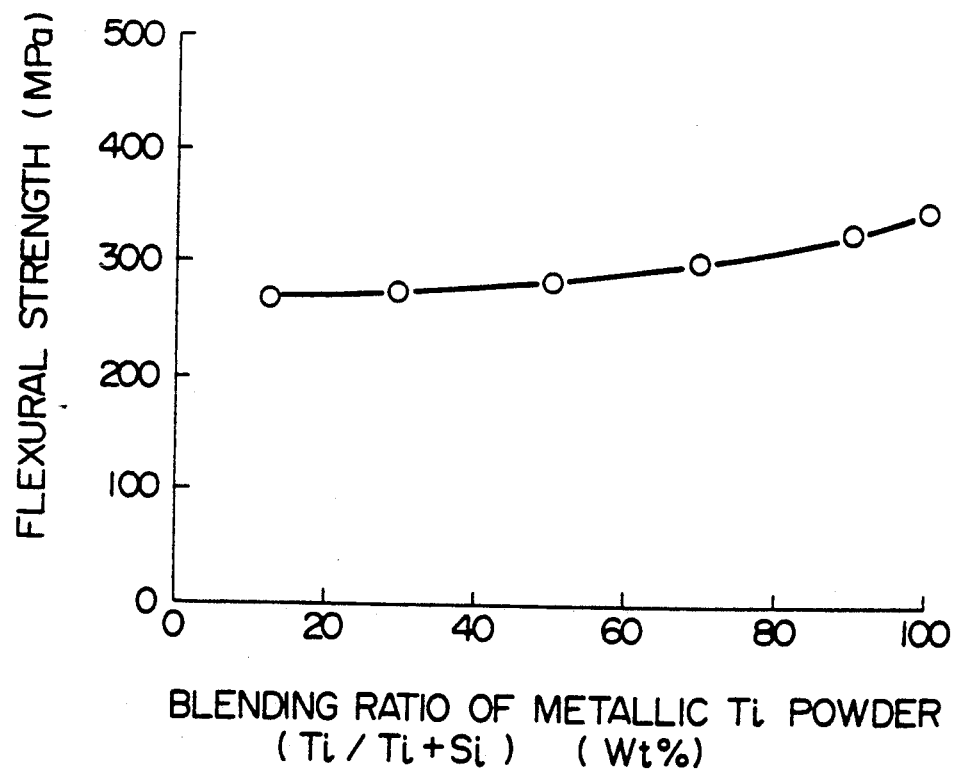

The results of tests on the relation between electrical resistivity and blending ratio of material and on the relation between flexural strength and blending ratio of material are shown in FIG. 3 and FIG. 4, respectively. From these test results, it is seen that electrical resistivity is variable within the range of 10 to $10^{-5}$ Ωcm depending on blending ratio of material, and that flexural strength of the obtained sintered body is not lower than 250 MPa regardless of blending ratio.

EXAMPLES 26-30

Figure 5:
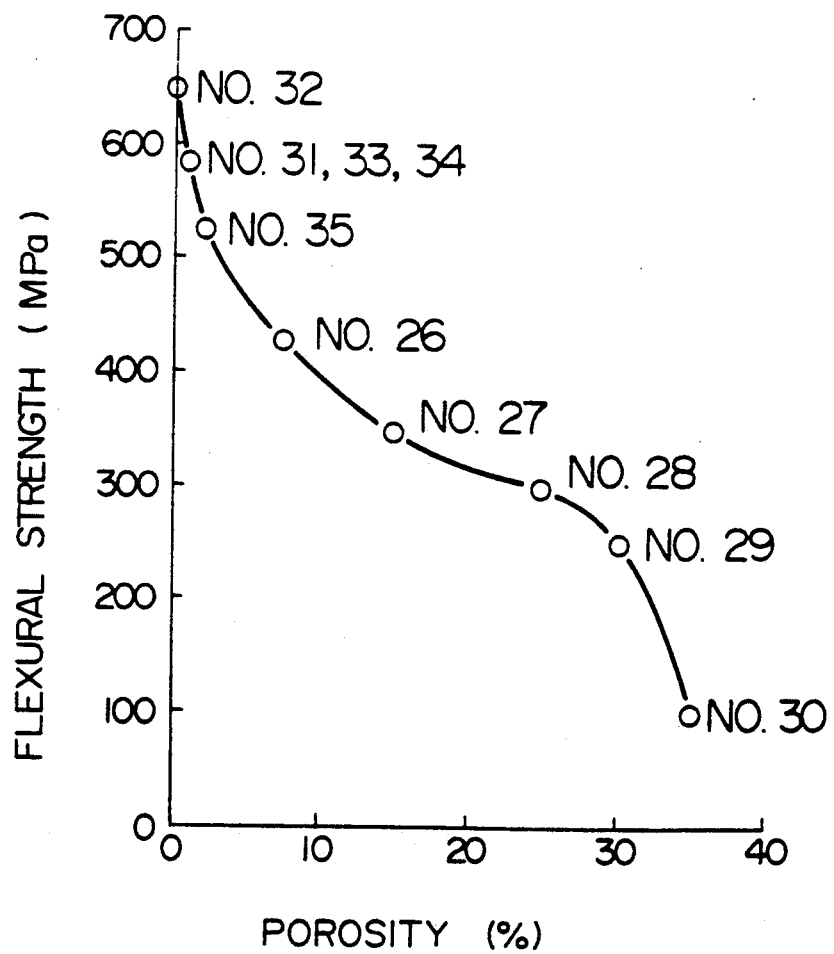
FIG. 5 is a graph showing the relation between porosity of sintered body and bending strength.

Sintered bodies with different porosities were obtained by changing the amount of molding binder used in otherwise the same way as Example 1, and these sintered bodies were subjected to the same tests as described above. The results are shown in Table 3. The relation between porosity and flexural strength is shown in FIG. 5.

It is known from these results that a flexural strength of 250 MPa or above can be obtained when the porosity is 30% or less, but the flexural strength lowers as the porosity increases, and when the porosity exceeds 30%, the flexural strength sharply drops to less than 250 MPa.

TABLE 3

| EXAMPLE | Porosity of sintered body (%) | Dimensional change during sintering (%) | Flexural strength (MPa) | Electrical resistivity (Ω cm) |
|---|---|---|---|---|
| 26 | 7.5 | 0.8 | 420 | $3 \times 10^{-5}$ |
| 27 | 15 | 0.8 | 340 | $3 \times 10^{-5}$ |
| 28 | 25 | 0.8 | 300 | $4 \times 10^{-5}$ |

TABLE 3-continued

| EXAMPLE | Porosity of sintered body (%) | Dimensional change during sintering (%) | Flexural strength (MPa) | Electrical resistivity ($\Omega$ cm) |
| --- | --- | --- | --- | --- |
| 29 | 30 | 0.8 | 250 | $6 \times 10^{-5}$ |
| 30 | 35 | 0.8 | 100 | $9 \times 10^{-5}$ |

EXAMPLES 31-35

The sintered body obtained in Example 1 was further subjected to hot press sintering under 20 to 35,000 atm. and at 1,500° to 2,200° C. for 150 minutes. The test results are shown in Table 4. As seen from the table, reaction sintering in nitrogen under pressure notably decreases the porosity to less than 2% but only slightly increases dimensional change. Also, the TiN reacted sintered bodies showed a very low electrical resistivity of $3 \times 10^{-5}$ $\Omega$cm and a flexural strength of about 500 to 650 MPa.

TABLE 4

| Example | HIP conditions | Porosity (%) | Flexural strength (MPa) | Electrical resistivity ($\Omega$ cm) |
| --- | --- | --- | --- | --- |
| 31 | $N_2$, 1800° C., 2000 atm. | 1 | 580 | $3 \times 10^{-5}$ |
| 32 | $N_2$, 2200° C., 1000 atm. | 0 | 650 | $3 \times 10^{-5}$ |
| 33 | $N_2$, 1500° C., 3500 atm. | 1 | 576 | $3 \times 10^{-5}$ |
| 34 | $N_2$, 1800° C., 850 atm. | 1 | 587 | $3 \times 10^{-5}$ |
| 35 | $N_2$, 2000° C., 20 atm. | 2 | 520 | $3 \times 10^{-5}$ |

EXAMPLE 36

A sintered body was obtained by following the same procedure as Example 1, except for change of the ratio of a metallic Ti powder having an average particle size of 1 μm and the ratio of SiC powder having an average particle size of 3 μm. The obtained sintered body was a 2-phase mixture in which the reaction product TiN was bound with SiC.

Figure 6:
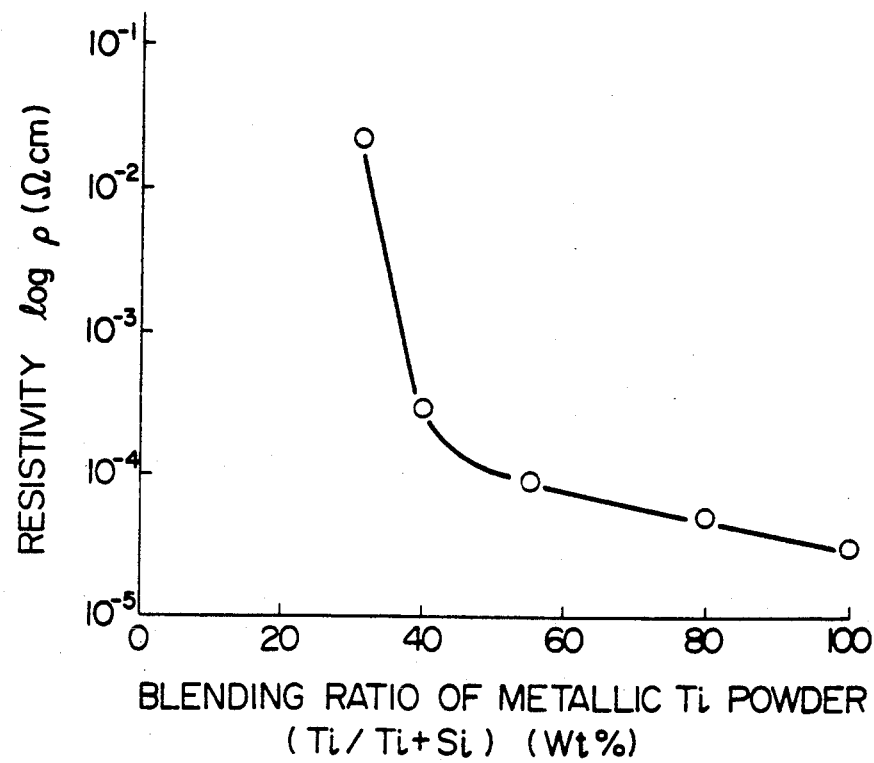

FIG. 6 shows the results of a test on the relation between electrical resistivity and blending ratio of material. It is seen that resistivity is variable within the range of $10^{-2}$ to $10^{-5}$ $\Omega$cm according to the blending ratio of material.

EXAMPLES 37-49

Molding and reaction-sintering of Example 1 were carried out with the mixtures of metallic Ti powder having an average particle size of 1 μm and various types of powdered inorganic compounds shown in Table 6 to obtain the sintered bodies. These sintered bodies were the mixtures in which the reaction product TiN was bound with various types of inorganic compounds.

It is noted that resistivity is variable according to the type and blending ratio of inorganic compound used.

EXAMPLE 50

Figure 7:
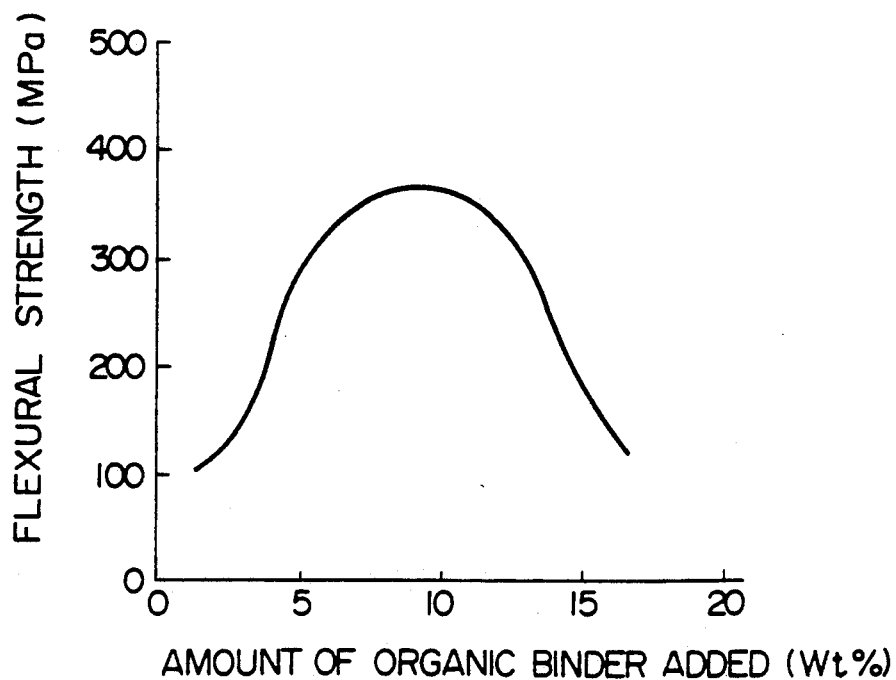
FIG. 7 is a graph showing the relation between amount of organic binder added and bending strength.

A reaction sintered body was produced by the same process as Example 1, except for change of the amount of thermoplastic resin binder used. FIG. 7 is a graph showing the relation between the amount of binder used and flexural strength. As seen from the graph, flexural strength sharply lowers when the amount of binder used is too small or too large. It is seen that use of a binder in an amount of 4 to 15% is desirable as a flexural strength of about 200 MPa or more can be obtained in this case, 5 to 14% is especially recommended as a flexural strength of about 300 MPa or above is obtainable.

TABLE 6

| Example | Inorganic compound used as starting material (wt %) | Electrical resistivity ($\Omega$ cm) |
| --- | --- | --- |
| 37 | TiN(40) | $3 \times 10^{-5}$ |
| 38 | $Al_2O_3$(60) | $5 \times 10^{-2}$ |
| 39 | $Si_3N_4$(30) | $4 \times 10^{-4}$ |
| 40 | $Si_3N_4$(50) | $6 \times 10^{-3}$ |
| 41 | $Si_3N_4$(60) | $9 \times 10^{-2}$ |
| 42 | $Cr_3C_2$30) | $9 \times 10^{-5}$ |
| 43 | $TiB_2$(15) | $6 \times 10^{-5}$ |
| 44 | $TiSi_2$(10) | $5 \times 10^{-5}$ |
| 45 | TaN(40) | $8 \times 10^{-5}$ |
| 46 | $SiO_2$(30) | $6 \times 10^{-4}$ |
| 47 | $Si_2N_2O$(20) | $4 \times 10^{-4}$ |
| 48 | VC(15) | $7 \times 10^{-5}$ |

EXAMPLE 51

A conductive ceramic made of a TiN sintered body obtained in Example 1 was adapted to a current collector and a collector ring of an Ac generator for automobiles, and the current collecting properties of said elements were examined. The results are shown in Table 5. It is seen that the products according to the present invention are less in wear and higher in wear resistance than the conventional copper-made collector ring and carbon-made current collector, and also remain free of any color change.

The test was conducted by revolving at a rate of 30,000 r.p.m. and a collector current density of 70 A/cm².

TABLE 5

| | | Example 51 | Comp. Example 2 |
| --- | --- | --- | --- |
| Collector ring | | TiN | Copper |
| Current collector | | TiN | Carbon |
| Coefficient of friction | | 0.13 | 0.20 |
| State of abraded surface | current collector | No change in luster | Had streaks |
| | Collector ring | No change in luster | Color changed into dark brown |
| Wear | Current collector | ≈0 | 0.82 μm |
| | Collector ring | 0.5-1 μm | 10-20 μm |
| Sparks | | None | None |

EXAMPLE 52

50% by weight of metallic Si powder having an average particle size of 0.9 μm was mixed with 50% by weight of $Al_2O_3$ powder having an average particle size of 1 μm. Then a polyethylene type thermoplastic resin was added in an amount of 7 parts by weight to 100 parts by weight of the starting material, and the mixture was kneaded by a press kneader under heating at 160° C. (softening point of the resin) for 4 hours. After cooling, the kneaded material was ground to a powder of less than 10 mesh to prepare a material for insulator ceramic A.

Separately from the above, there was formed a mixture comprising 20% by weight of metallic Ti powder (average particle size: 1.6 μm) and 80% by weight of SiC powder (average particle size: 1 μm), then a polyethylene type thermoplastic resin was added in an amount of 5 parts by weight to 100 parts by weight of starting material, and the mixture was kneaded by a press kneader similarly under heating at 160° C. for 4 hours. After cooling, the kneaded material was ground to a powder of less than 10 mesh to prepare a material for conductive ceramic B.

Figure 8:
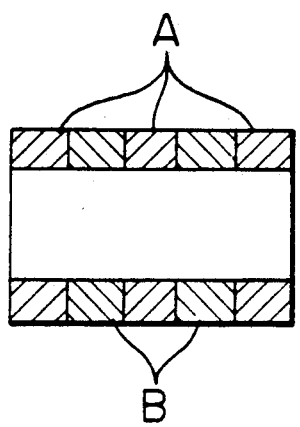
FIG. 8 and FIG. 9 are a sectional view and a side elevational view, respectively, of a collector ring for an AC genenator for automobiles.
Figure 9:
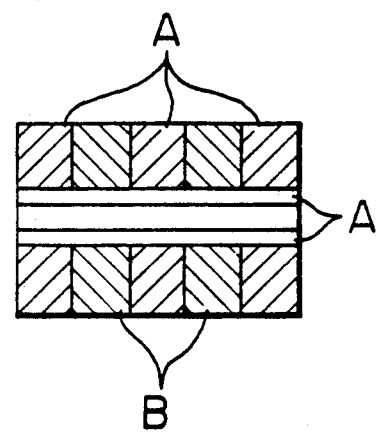

Then the materials of ceramic A and ceramic B were packed successively in a metal to make a cylindrical collector ring for motor shown in FIGS. 8 and 9. The reaction sintering conditions were the substantially same as in Example 1.

After removing the binder in the molding, the latter was heated in a nitrogen atmosphere to obtain a ceramic complex. Dimensional change that occurred in forming a sintered body from the molding was as small as 0.2%, and no cracks formed. Resistivity of ceramic A was about $10^{14}$ Ωcm and that of ceramic B was $7 \times 10^{-5}$ Ωcm. Conductor and insulator were firmly bound to each other with the reaction products $Si_3N_4$ and TiN.

In the similar way, the ceramics with different electrical resistivities can be integrally molded and sintered in a laminar form by changing the type and blending ratio of metallic powder and inorganic compound.

EXAMPLE 53

Figure 10A:
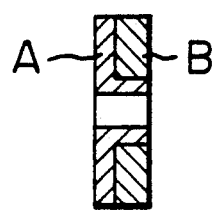
FIG. 10(a) and FIG. 10(b) are a sectional view and a side elevational view, respectively, of a commutator.
Figure 10B:
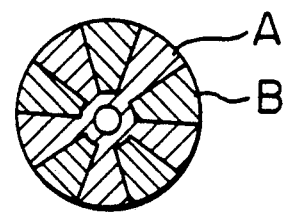

A commutator having the shape shown in FIG. 10 was produced in the same way as described above by using ceramics A and B of Example 52. In this example, too, dimensional change was as small as 0.2%, and the product had excellent wear resistance. In FIG. 10 (a) is a schematical cross-sectional view of the commutator, and FIG. 10(b) is a schematical side elevational view thereof.

EXAMPLE 54

A U-shaped heater (resistance: 0.1 Ω, resistivity: $6 \times 10^{-3}$ Ωcm) such as shown in FIG. 11(a) and FIG. 11(b) was made by using electrically conductive ceramic obtained in Example 40. A metallic layer is provided at terminal 1 of this heater. The heater terminal electricity $V_H$, current $V_1$ and heater end temperature $T_H$ at the time of application of a DC voltage of 12V to said heater terminal are shown in FIG. 12. The heater end temperature reached 900° C. in about 0.8 second, 1,200° C. in about 1.2 second and 1,500° C. in about 1.8 second, indicating the quickly heated property of the heater. On the other hand, load current decreased (indicating positive resistance temperature properties) as the heater temperature increased with electrification. This helps to prevent trouble such as fusing of the heater by thermal runaway.

EXAMPLE 55

Figure 13:
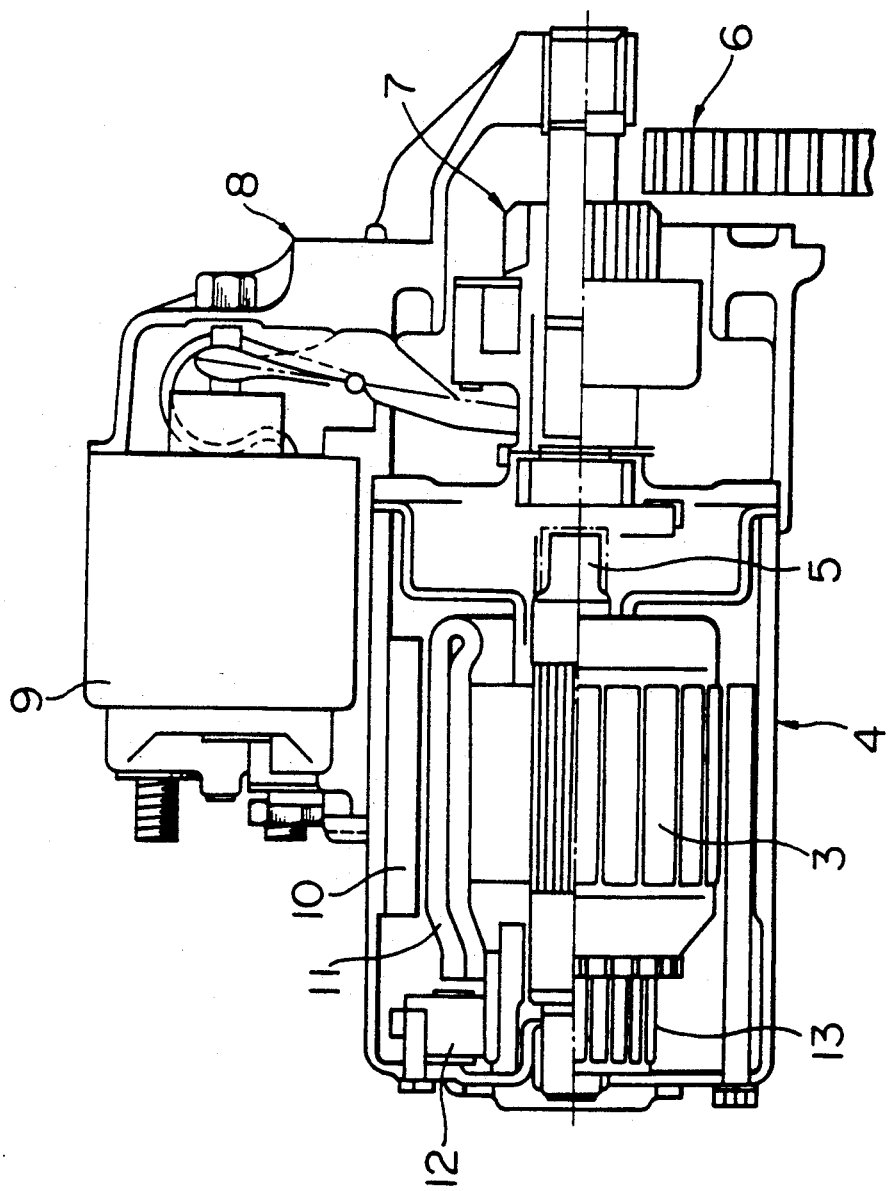
FIG. 13 is a schematical cross-sectional view illustrating an automobile starter using the conductive material according to this invention.

An armature unit in an automobile starter such as illustrated in FIG. 13 was manufactured in the manner described below, assembled in an automobile and tested. In the drawing, numeral 3 denotes armature, 4 yoke, 5 planetary reduction gear, 6 ring gear, 7 pinion, 8 bracket, 9 magnetic switch, 10 permanent magnet, 11 coil conductor, 12 brush, and 13 commutator.

A mixture was formed comprising 50% by weight of metallic Si powder having an average particle size of 0.9 μm and 50% by weight of $Al_2O_3$ powder having an average particle size of 1 μm. Then a polyethylene type thermoplastic resin was added in an amount of 7 parts by weight to 100 parts by weight of the starting material and kneaded by a press kneader at 160° C. for 4 hours. The kneaded mixture was ground to a powder of less than 10 mesh to prepare a base material for insulator ceramic A.

Figure 15:
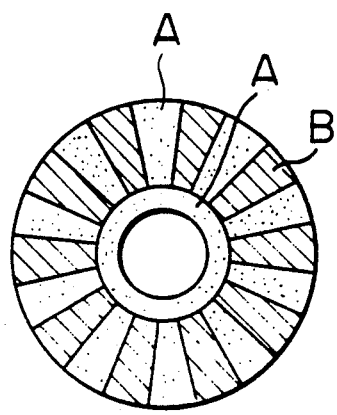
FIG. 15 is a schematical view showing the geometry of a slip ring made by using the conductive material of this invention.

Separately, a mixture comprising 80% by weight of metallic Ti powder having an average particle size of 1.6 μm and 20% by weight of TiN powder having an average particle size of 1 μm was formed, followed by addition of a polyethylene type thermoplastic resin in an amount of 5 parts by weight to 100 parts by weight of the starting material and kneading by a press kneader at 160° C. for 4 hours The kneaded mixture was ground to a powder of less than 10 mesh to prepare a base material for conductor ceramic B. Then said material for ceramic A and material for ceramic B were filled in a mold and molded into a product such as shown in FIG. 15. After removing the binder, the molding was heated in a nitrogen atmosphere to obtain a ceramic complex. Only 0.2% of dimensional change was seen in conversion from the molding into the sintered body, and no cracking took place. Resistivity of ceramic A was about $10^{14}$ Ω cm and that of ceramic B was $4 \times 10^{-5}$ Ω cm. Both the conductor and insulator were securely bound with the reaction products $Si_3N_4$ and TiN.

The conventional copper wire was replaced by ceramic coil formed by coating the copper wire with ceramic.

There could be produced a lightweight starter having excellent sliding characteristics and not becoming non-combustible even when the internal temperature of the starter becomes close to 400° C. as the test results confirmed.

EXAMPLE 56

Figure 14:
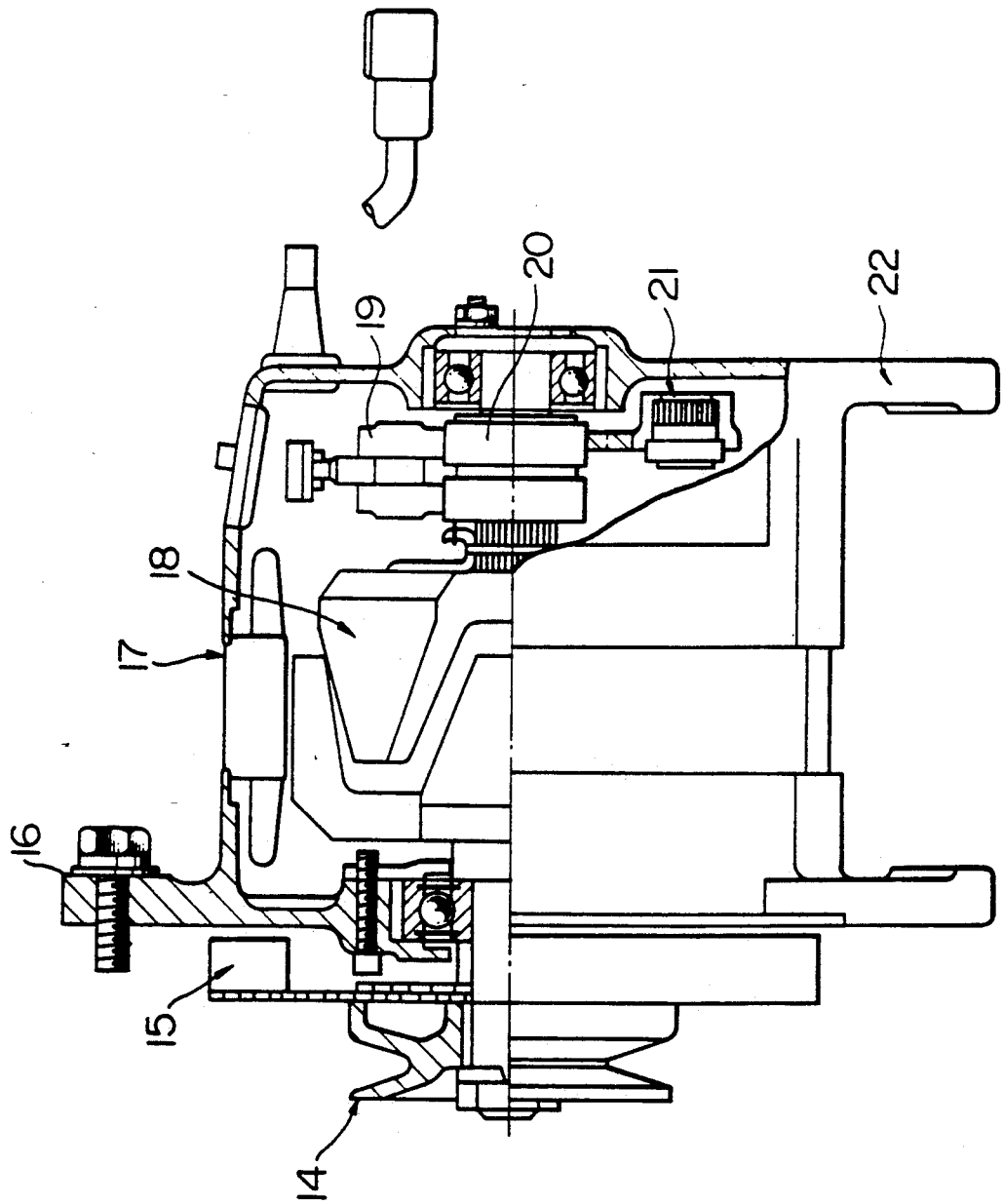
FIG. 14 is a schematical cross-sectional view illustrating an alternator for automobiles using the conductive material of this invention.

A brush and slip ring in an alternator for automobiles shown in FIG. 14 were made in the same manner as Example 55 so as to have a geometry shown in FIG. 15, and the product was incorporated in an automobile and tested. In FIG. 14, numeral 14 designates pulley, 15 fan, 16 front bracket, 17 stator, 18 rotor, 19 brush, 20 slip ring, 21 silicon diode, and 22 rear bracket.

The test results are shown in Table 6. The test conditions were 40,000 r.p.m. and 60 A/cm² as collector current density. According to the present invention, it is possible to obtain a lightweight alternator having excellent wear resistance and spark control.

Figure 16A:
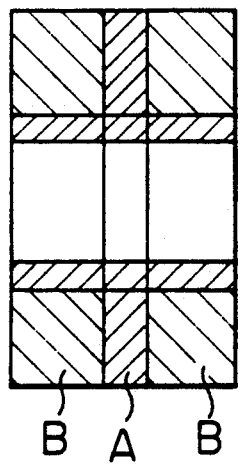
FIG. 16(a) is an axial sectional view of the slip ring.
Figure 16B:
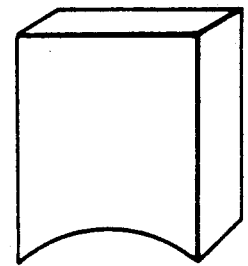
FIG. 16(b) is a pictorial view of a brush.

FIG. 16(a) shows a slip rig, and FIG. 15(b) shows a brush.

TABLE 6

| Example 2 | | |
|---|---|---|
| Slip ring | | TiN |
| Brush | | TiN |
| Coefficient of friction | | 0.12 |
| State of abraded surface | Brush | Lustrous |
| | Slip ring | Lustrous |
| Wear | Brush | ≈0 |
| | Slip ring | 0.8-1 μm |

TABLE 6-continued

| Example 2 | |
|---|---|
| Sparks | None |

Test conditions: 40,000 r.p.m.; collector current density = 60 A/cm$^2$.

What is claimed is:

1. A conductor material made of an electrically conductive nitride produced by reaction sintering a shaped body consisting essentially of (a) particles of at least one metal from Ti, Zr, V, Nb, Ta, Cr, W, Fe and Ni, said particles being free of Si, and (b) particles of at least one inorganic compound selected from a carbide, nitride, oxynitride, oxide silicide and boride in a CO-free nitrogen-containing atmosphere at a temperature below the melting point of the mixed powder of (a) and (b), so that said particles of said at least one inorganic compound are linked to another by particles and whiskers of nitride of said at least one metal formed by said reaction sintering, said conductor material having an electrical resistivity of $10^{14}$ to $10^{-5}$ $\Omega$ cm, wherein said conductor material has a porosity below 30%.

2. The conductor material made of an electrically conductive nitride according to claim 1 having an electrical resistivity at room temperature of $1 \times 10^{-5}$ $\Omega$ cm to $5 \times 10^{-5}$ $\Omega$ cm.

3. A conductor material made of particles and whiskers of an electrically conductive nitride produced by reaction sintering a shaped body consisting essentially of (a) particles of at least one metal from Ti, Zr, V, Nb, Ta, Cr, W, Fe and Ni, said particles being free of Si, and (b) particles of at least one inorganic compound selected from carbide, nitride, oxynitride, oxide, silicide and boride in a CO-free nitrogen-containing atmosphere at a temperature below the melting point of the mixed powder of (a) and (b), said conductor material having an electrical resistivity of $10^{14}$ to $10^{-5}$ $\Omega$ cm, wherein said conductor material has a porosity below 30%.

4. A conductor material made of an electrically conductive nitride produced by reaction sintering a shaped body consisting essentially of (a) particles of at least one metal from Ti, Zr, V, Nb, Ta, Cr, W, Fe and Ni, (b) particles of at least one of silicon and aluminum, and (c) particles of at least one inorganic compound selected from a carbide, nitride, oxynitride, oxide, silicide and boride, wherein said shaped body has a particle volume packing density of at least 60 vol % and said particles of at least one of silicon and aluminum are contained in an amount of 90% by volume or less, in a CO-free nitrogen-containing atmosphere at a temperature below the melting point of the mixed metal powder of (a), (b) and (c), so that said particles of said at least one inorganic compound are linked to one another by particles and whiskers of nitride of said at least one metal formed by said reaction sintering, said conductor material having an electrical resistivity of $10^{14}$ to $10^{-5}$ $\Omega$ cm or less, wherein said conductor material has a porosity below 30%.

5. The conductor material made of an electrically conductive nitride according to claim 4, having an electrical resistivity at room temperature of $1 \times 10^{-5}$ $\Omega$ cm to $5 \times 10^{-5}$ $\Omega$ cm.

6. A conductor material made of particles and whiskers of an electrically conductive nitride produced by reaction sintering a shaped body consisting essentially of (a) particles of at least one metal from Ti, Zr, V, Nb, Ta, Cr, W, Fe and Ni, (b) particles of at least one of silicon and aluminum, and (c) particles of at least one inorganic compound selected from a carbide, nitride, oxynitride, oxide, silicide and boride, wherein said shaped body has a particle volume packing density of at least 60 vol % and said particles of at least one of silicon and aluminum are contained in an amount of 90% by volume or less, in a CO-free nitrogen-containing atmosphere at a temperature below the melting point of the mixed metal powder of (a), (b) and (c), said conductor material having an electrical resistivity of $10^{14}$ to $10^{-5}$ $\Omega$ cm or less, wherein said conductor material has a porosity below 30%.

7. A ceramic composite article which comprises a laminate of at least first and second layers, each of said first and second layers being made of the reaction-sintered conductor materials claimed in any one of claims 1, 3, 4 and 6, said first layer having a different electrical resistivity than said second layer, and said first and second layers being integrally sintered.

8. The conductor material made of an electrically conductive nitride according to claim 3, having an electrical resistivity at room temperature of $1 \times 10^{-5}$ $\Omega$ cm to $5 \times 10^{-5}$ $\Omega$ cm.

9. The conductor material made of an electrically conductive nitride according to claim 6, having an electrical resistivity at room temperature of $1 \times 10^{-5}$ $\Omega$ cm to $5 \times 10^{-5}$ $\Omega$ cm.

10. A conductor material according to claim 4, wherein said (a) particles of at least one metal are selected from the group consisting of Ti, Zr, V, Nb, Ta, Cr, W and Ni.

* * * * *